July 15, 1958 A. B. GLENN ET AL 2,843,741

REACTANCE TUBE CIRCUIT

Filed Oct. 17, 1955

INVENTORS
Alvin B. Glenn
& Robert H. Ray
BY
F. A. Rechif
ATTORNEY

United States Patent Office 2,843,741

Patented July 15, 1958

2,843,741

REACTANCE TUBE CIRCUIT

Alvin B. Glenn, Haddonfield, and Robert H. Ray, Moorestown, N. J., assignors to Radio Corporation of America, a corporation of Delaware Application October 17, 1955, Serial No. 540,689

4 Claims. (Cl. 250—36)

This invention relates to a reactance tube circuit, and more particularly to a circuit of this kind particularly suitable for use in conjunction with oscillators operating in the ultra high frequency (U. H. F.) range, for example from 150 to 400 megacycles per second. At low frequencies, pentodes can be, and are, used successfully as reactance tubes in a more or less well-known type of circuit coupled to the tuned circuit of an oscillator. As the frequency of operation increases, however, certain effects are produced which disturb the proper phase relationships in such reactance tube circuits, and this disturbance along with other effects at the higher frequencies causes the miniature type of tube to be inefficient if not ineffective at the higher frequencies. Other types of tubes, and other possible circuit arrangements, likewise present great difficulties at the higher frequencies of operation.

An object of this invention is to devise a novel reactance tube circuit arrangement which will operate efficiently and effectively at high frequencies, for example in the U. H. F. range.

Another object is to provide a novel reactance tube circuit arrangement utilizing two tubes.

A further object is to devise a novel reactance tube circuit arrangement utilizing triodes, eliminating the drawbacks usually present with the use of tubes of this type.

The objects of this invention are accomplished, briefly, in the following manner: A grounded cathode stage and a grounded grid stage together constitute the reactance tube circuit arrangement of the invention, the anode of the grounded grid stage being connected directly to the oscillator tuned circuit and the grid of the grounded cathode stage being connected to the tuned circuit through a high resistance, the phase shift being provided by a capacitor across the input of the grounded cathode stage. To complete the circuit, the anode of the grounded cathode stage is coupled to the cathode of the grounded grid stage.

A detailed description of the invention follows, in connection with the accompanying drawings, wherein.

Figure 1:
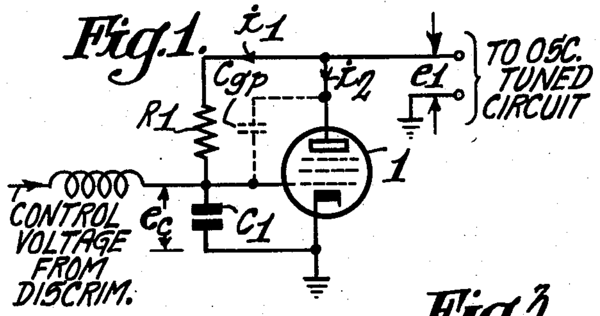
Fig. 1 is a schematic diagram of a known type of reactance tube.

In the drawing, Fig. 1 is a simplified diagram of a conventional reactance tube circuit using a pentode vacuum tube 1 whose anode is directly connected to the oscillator tuned circuit and is connected also to its control grid through a resistor $R_1$, the phase shifted voltage for the control grid being provided by a capacitor $C_1$ connected between the control grid and the cathode of tube 1. The voltage $e_1$ across the oscillator tuned circuit will cause a current $i_1$ to flow through the $R_1$, $C_1$ branch.

If $R_1$ is much larger than the reactance of the capacitor $C_1$ at the oscillator frequency, then this current $i_1$ will be essentially in phase with $e_1$. However, the voltage $e_C$ across capacitor $C_1$ will lag the current $i_1$ by 90°. Since the anode current $i_2$ is in phase with the grid-to-cathode voltage $e_C$, it will lag the voltage $e_1$ by 90° Thus, the tube 1 provides a reactive (inductive) effect across the oscillator tuned circuit.

Figure 2:
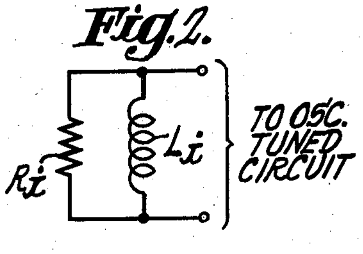
Fig. 2 is an equivalent circuit diagram for a reactance tube arrangement.

By the proper choice of the various elements in the circuit of Fig. 1, the same reduces to the simple form illustrated in Fig. 2, which comprises an equivalent inductance $$L_i \approx \frac{C_1 R_1}{g_m} \quad (1)$$

and an equivalent resistance $$R_i = \frac{(\omega C_1 R_1)^2}{g_m} \quad (2)$$

where $\omega = 2\pi f$ and $g_m$ is the transconductance of the reactance tube, $f$ being the frequency of operation of the oscillator. As the frequency of operation $f$ increases, the anode to grid interelectrode capacitance $C_{gp}$ (shown in dotted lines in Fig. 1) acts to lower the effective impedance between the anode and grid of the reactance tube 1, $C_{gp}$ being in parallel with $R_1$, as may be seen from the following expression for this effective impedance, $Z_e$:

$$Z_e = \frac{R_1}{1 + (\omega C_{gp} R_1)^2} \quad (3)$$

From Equation 3, it may be seen that as the frequency $f$ (and therefore $\omega$) increases, the effective impedance $Z_e$ decreases. Also, as the frequency of operation increases, the resistance between the grid and cathode of tube 1 decreases, because of transit time effects and tube lead inductances. Both of these effects (the decrease of the resistance between the anode and grid of the tube, and the decrease of the resistance between the grid and cathode of the tube) disturb the proper phase relationships in the reactance tube circuit.

In addition, in the U. H. F. region, the self inductance and mutual inductance effects of the tube lead inductances, plus other discontinuities due to the tube structure, cause resonances which make the minature type of tube (such as pentode 1) inefficient if not ineffective at the higher frequencies.

At first glance, it might be thought possible to use a triode instead of a pentode, to reduce the lead inductance loading effect. However, this creates stability problems, since the same relative stability problems for triodes and pentodes existing in amplifiers also are present for reactance stages.

Also, it might be thought possible to reverse the $R_1C_1$ configuration from that shown in Fig. 1, that is, to interchange the R and C. However, this is not practical at the higher frequencies because of the cathode-to-grid capacitance of the tube. If the RC circuit is reversed, then to obtain the proper phase shift it will be necessary to tune out the input capacitance of the reactance tube. This may result in an unstable condition, and in addition complicates the circuit, because of the necessary tuning.

$R_1$ must be much less than the reactance of $C_{gp}$ at the oscillator frequency $f$, in order to realize the proper phase shift between the voltage $e_1$ across the anode and cathode of tube 1 and the voltage $e_C$ across the grid and cathode of this tube. If the reactance of $C_{gp}$ is much less than $R_1$, the impedance between anode and grid of tube 1 is predominantly reactive and looks capacitive, since $R_1$ and $C_{gp}$ are effectively in parallel between the anode and grid of this tube. Voltage $e_C$ is then essentially in phase with voltage $e_1$ and the reactance tube circuit is resistive (degenerative) in nature. However, if $R_1$ is much less than the reactance of $C_{gp}$, $e_C$ is 90° lagging $e_1$ and the reactance tube circuit looks reactive to the oscillator tuned circuit. Even with U. H. F. tubes such as the RCA pencil triode, the effect of the anode to grid capacitance is too great, since as just stated it is necessary to have $R_1$ much less than the reactance of $C_{gp}$. But $R_1$ cannot be too low, because of the loading effect on the oscillator. If the oscillator frequency range is narrow, it is possible to neutralize the anode-to-grid capacitance. However, this becomes impractical for a large oscillator frequency range, e. g. 2 to 1.

A single tube with a grounded grid connection cannot as a practical matter be readily used as a U. H. F. reactance tube. The most important reason for this is that the grounded grid circuit tends to be unstable unless considerable precaution is taken. Tuning out either the anode-to-cathode capacitance or cathode-to-grid capacitance not only becomes quite complicated for a large (two to one) oscillator tuning range, but instability becomes a factor for a desired range of frequency control.

Figure 3:
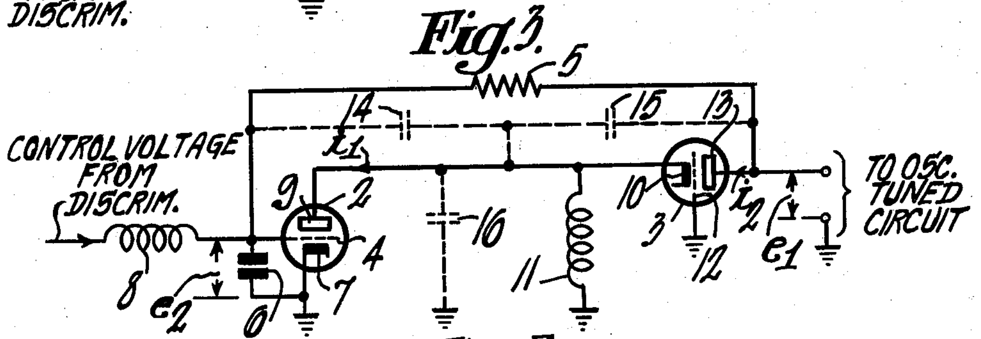
Fig. 3 is a simplified circuit diagram of a reactance tube arrangement according to the invention.

To overcome all of the disadvantages of the prior art circuits which have been mentioned, including those resulting from the use of the pentode, pencil triode and grounded-grid connections at U. H. F., is the purpose of the present invention, illustrated in Fig. 3. Fig. 3 is a simplified diagram, in which unidirectional potential connections, D. C. blocking condensers, etc., have been omitted for convenience. The circuit of Fig. 3 illustrates a grounded cathode amplifier tube 2 driving a grounded grid amplifier tube 3. The grid 4 of vacuum tube 2 (which is preferably a triode) is connected to the "high" or ungrounded end of the oscillator tuned circuit through a resistor 5 which corresponds to resistor $R_1$ in Fig. 1. The phase shift is provided by means of a capacitor 6 (similar to $C_1$ in Fig. 1) which is connected between the grid 4 and the cathode 7 of tube 2. A control voltage or bias voltage from a stage such as a discriminator (not shown) is impressed on the grid 4 by way of an inductor 8.

The anode 9 of tube 2 is connected to the cathode 10 of the grounded grid amplifier tube 3 (which, like tube 2, is preferably a triode). The grid 12 of tube 3 is directly connected to ground, while the anode 13 of this tube is connected to the high radio frequency potential or ungrounded end of the oscillator tuned circuit, to complete the reactance tube circuit.

Capacitor 14 (shown in dotted lines) represents the grid-to-anode (interelectrode) capacitance of tube 2, while capacitor 15 (also shown in dotted lines) represents the cathode-to-anode (interelectrode) capacitance of tube 3. Capacitors 14 and 15 have a common junction, the common connection of anode 9 and cathode 10.

Capacitor 16 (shown in dotted lines) represents the total capacitance of the circuit between tubes 2 and 3. This includes the output capacitance of tube 2 plus the input capacitance of tube 3 plus any capacitance of the coupling circuit (between anode 9 and cathode 10).

The inductor 11, which is connected from the anode 9 to ground, tunes the capacitance 16 at the center frequency of the oscillator. This circuit is non-critical because of its low Q. Such circuit (between tubes 2 and 3) has a low Q because of the low input resistance of the grounded grid stage 3.

The operation of the circuit of Fig. 3 is as follows: As in Fig. 1, the combination of the resistor 5 (one end of which is connected to the oscillator tuned circuit and the other to grid 4) and the capacitor 6 provides a grid-cathode voltage $e_2$ for the tube 2 which lags 90° behind the oscillator tank voltage $e_1$. The ground grid amplifier 3 does not disturb the phase relationships between the anode current $i_2$ of tube 3 and the grid to cathode voltage $e_2$ of tube 2. In this connection it is pointed out that at low input transit angles the output and input currents of a grounded amplifier such as 3 are equal in phase and amplitude so that $i_2=i_1$, which latter is in phase with $e_2$. However, $e_2$ is lagging behind $e_1$ by 90°. Therefore, $i_2$ lags $e_1$ by 90° and the reactance tube arrangement or combination acts as an effective inductance across the oscillator tuned circuit. The equivalent circuit for the Fig. 3 arrangement is then as illustrated in Fig. 2. The radio frequency voltage from the oscillator tuned or tank circuit is applied to the grid 4 of tube 2, which drives the cathode 10 of the grounded-grid tube 3 by means of the connection between anode 9 and such cathode. The circuit is completed to the oscillator tuned circuit by means of the connection between anode 13 and such tuned circuit.

The reactance tube arrangement of this invention provides several advantages over the simple triode or pentode reactance tube. The first tube 2 may be a high frequency triode such as a type 6BA4. Since this tube is a triode in a grounded cathode connection, the loading offered to the oscillator tank circuit by the grid 4 is due only to transit time effects and is relatively low.

The resistor 5 is in effect paralleled by the series combination of the capacitors 14 and 15. The capacitive reactance across resistor 5 is $1/\omega C$ where $$C=\frac{C_2C_3}{C_2+C_3}$$

$C_2$ and $C_3$ being the capacitances of capacitors 14 and 15, respectively. This last expression reduces to approximately $C_3$, since $C_3$ (the value of capacitor 15) is much less than $C_2$ (the value of capacitor 14). The capacitive reactance is high since the total capacitance C is that of the series combination $C_2$ and $C_3$ and this total capacitance C is less than the smallest capacitor of the combination; hence, the capacitive reactance is larger than in either the grounded grid or grounded cathode (Fig. 1) configurations.

The requirement on resistor 5 is that it be much less than the capacitive reactance thereacross, so that the feedback network including resistor 5 and capacitors 14 and 15 appears resistive. Since this capacitive reactance is larger than in prior circuits, the resistor 5 may have a larger value of resistance. Thus, the loading on the oscillator is reduced considerably, due to this high value of resistance. This effect is due to tube 3 being connected to grounded grid, the capacitance 15 being as a result quite low.

The input resistance of the grounded-grid triode amplifier 3 constitutes the load of the grounded-cathode triode 2 and, as has previously been stated, the grounded grid connection provides a low input resistance. Thus, the grounded cathode triode 2 is stable, because it is operating into a very low load.

To recapitulate, the grounded grid amplifier 3 not only provides a low effective capacitance across resistor 5 and a low load for tube 2 for stability, but also it does not disturb the phase relationship between the anode current $i_2$ drawn through the oscillator tuned circuit and the grid to cathode voltage $e_2$ of the triode 2. An effective inductance is thus provided by the reactance tube arrangement of this invention.

As previously stated, the circuit between tubes 2 and 3 has a very low Q, because of the low input resistance of the grounded grid stage 3. This Q is on the order of 2. If the coupling circuit between tubes 2 and 3 has a very low Q, or if the bandwidth of this circuit is very much greater than the frequency range through which the oscillator will be varied, then the tuning of this circuit to the center frequency of the oscillator variation is the most desirable tuning point. The inductor 11 tunes the capacitor 16 at the center frequency of hte oscillator variation or tuning range. The phase shift of this circuit for a ±40% change in frequency will be negligible.

Figure 4:
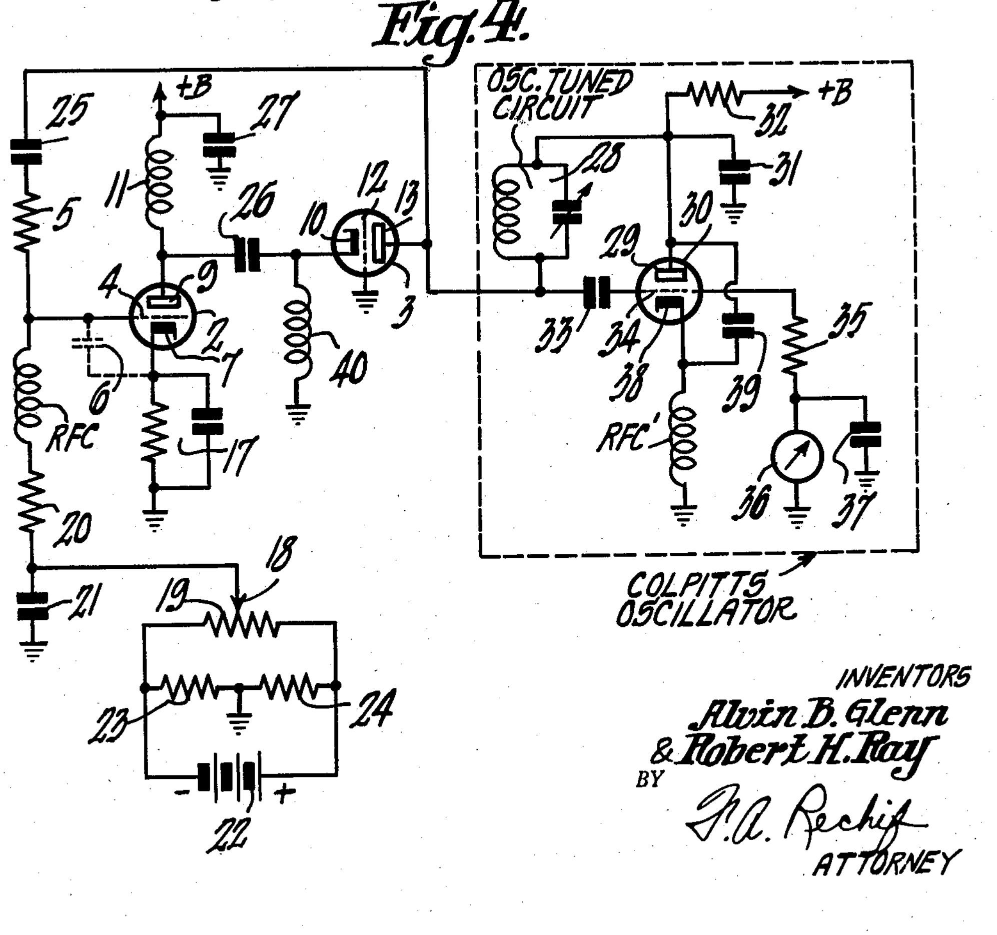
Fig. 4 is a circuit diagram of a practical circuit arrangement according to the invention.

Fig. 4 is a schematic diagram of a practical circuit arrangement according to this invention. In this setup, the grounded cathode tube 2 and the grounded grid tube 3 can be modified RCA pencil tubes of the 2441 type, these being good high frequency tubes and having a high maximum transconductance (approximately 20,000 micromhos). In this case, the phase shifting capacitor 6 (which is connected between the grid 4 and the cathode 7 of the grounded cathode tube 2) is actually the interelectrode capacitance between the grid and the cathode of this tube. The cathode 7 is connected to ground through a resistance-capacitance self-biasing network 17.

For experimental purposes, a variable D. C. bias or control voltage is supplied to grid 4 from the movable tap 18 on a potentiometer 19, through a resistor 20 and a choke RFC. The D. C. control voltage is filtered by means including a capacitor 21 connected from tap 18 to ground. The D. C. voltage is furnished by a battery 22 of about 15 volts which is connected across potentiometer 19, the midpoint of this battery being in effect grounded by means of a pair of series-connected resistors 23 and 24 across the battery 22, the common junction of these resistors being grounded. By moving the arm 18 on potentiometer 19, a variable D. C. bias can be applied to grid 4.

Anode 13 of the grounded grid tube 3 is connected by way of means including resistor 5 to the grid 4, a D. C. blocking condenser 25 being interposed between anode 13 and resistor 5, to keep anode potential off grid 4. Capacitor 25 has negligible reactance at the operating frequency. The anode 9 of tube 2 is connected to the cathode 10 of tube 3 through a D. C. blocking condenser 26, in order to keep anode potential off cathode 10. Capacitor 26 also has inappreciable reactance at the operating frequency. From anode 9, inductor 11 is connected through a bypass capacitor 27 to ground. The capacitor 27 is essentially a low impedance circuit to ground at radio frequency, so one end of this inductor is essentially grounded, just as in Fig. 3. A high impedance choke 40 is connected between cathode 10 and ground, to provide a D. C. path for tube 3.

The anode 13 and grid 4 (the latter through components 5 and 25) are connected to one end of an oscillator tuned circuit 28 the opposite end of which is connected to the anode 29 of a triode vacuum tube 30, for example of the 6AF4 type, and is also connected to ground for radio frequencies by means of a bypass capacitor 31. Anode operating potential is supplied to anode 29 through a resistor 32, from the positive terminal of a unidirectional potential source. The high radio frequency potential end of the oscillator tuned circuit 28 (the same end that is connected to the anode 13 and grid 4 of the reactance tube arrangement) is connected through a capacitor 33 to the grid 34 of the oscillator tube 30. Grid 34 is connected through a series-connected resistor 35 and current-indicating meter 36 to ground, a capacitor 37 being connected in parallel with the meter 36. The cathode 38 of tube 30 is connected through a choke RFC′ to ground, and is also connected through a capacitor 39 to anode 29.

The oscillator described is connected in the well-known Colpitts circuit. The reactance tube arrangement is not connected across the entire tuned circuit of the ocsillator, because of the relatively large return paths to ground. For this reason, it is only partially effective. Notwithstanding this, a frequency swing of 2 mc. was obtained, which proves that the reactance tube arrangement was operating effectively.

The following values are given by way of example for some of the components of Fig. 4. These were the values used in a circuit built according to this invention and successfully tested at a frequency of about 300 megacycles.

| | | |
|---|---|---|
| Resistor **5** | ohms | 470 |
| Resistor **20** | do | 10,000 |
| Resistor **23** | do | 10,000 |
| Resistor **24** | do | 10,000 |
| Resistor **32** | do | 470 |
| Resistor **35** | do | 12,000 |
| Capacitor **21** | mmfd | 500 |

| | | |
|---|---|---|
| Capacitor **25** | mmfd | 56 |
| Capacitor **26** | mmfd | 100 |
| Capacitor **27** | mmfd | 500 |
| Capacitor **31** | mmfd | 560 |
| Capacitor **33** | mmfd | 100 |
| Capacitor **37** | mmfd | 100 |
| Capacitor **39** | mmfd | 7 |

What is claimed is:

1. In a high frequency circuit, in combination: a first electron discharge device having a cathode, a grid, and an anode, a second electron discharge device having a cathode, a grid, and an anode, means connecting the grid of said second device to operate at zero signal potential, means for feeding a high frequency signal from the anode of said first device to the cathode of said second device, and a network intercoupling the anode of said second device and the grid and cathode of said first device to provide a grid-cathode voltage for said first device which lags 90° behind the voltage at the anode of said second device.

2. In a high frequency reactance tube circuit, in combination: a first electron discharge device having a cathode, a grid, and an anode, a second electron discharge device having a cathode, a grid, and an anode, means connecting the grid of said second device to operate at zero signal potential, means for feeding a high frequency signal from the anode of said first device to the cathode of said second device, means connecting the anode of said second device to the tuned circuit of an oscillator, and a network intercoupling the anode of said second device and the grid and cathode of said first device to provide a grid-cathode voltage for said first device which lags 90° behind the voltage at the anode of said second device.

3. In a high frequency circuit, in combination: a first electron discharge device having a cathode, a grid, and an anode, a second electron discharge device having a cathode, a grid, and an anode, means connecting the grid of said second device to operate at zero signal potential, means for feeding a high frequency signal from the anode of said first device to the cathode of said second device, and a phase shifting network including resistance and capacitance connected between the anode of said second device and the cathode of said first device, the capacitance of said network being connected between the cathode and the grid of said first device, the impedance offered by said resistance being large compared to that offered by said capacitance at said high frequency, thereby to provide a grid-cathode voltage for said first device which lags 90° behind the voltage at the anode of said second device.

4. In a high frequency reactance tube circuit, in combination: a first electron discharge device having a cathode, a grid, and an anode, a second electron discharge device having a cathode, a grid, and an anode, means connecting the grid of said second device to operate at zero signal potential, means for feeding a high frequency signal from the anode of said first device to the cathode of said second device, means connecting the anode of said second device to the tuned circuit of an oscillator, and a phase shifting network including resistance and capacitance connected between the anode of said second device and the cathode of said first device, the capacitance of said network being connected between the cathode and the grid of said first device, the impedance offered by said resistance being large compared to that offered by said capacitance at said high frequency, thereby to provide a grid-cathode voltage for said first device which lags 90° behind the voltage at the anode of said second device.

References Cited in the file of this patent

UNITED STATES PATENTS

| | | |
|---|---|---|
| 2,427,231 | Sear | Sept. 9, 1947 |
| 2,540,167 | Houghton | Feb. 6, 1951 |
| 2,692,919 | Cohen | Oct. 26, 1954 |

FOREIGN PATENTS

| | | |
|---|---|---|
| 856,156 | France | June 3, 1940 |

UNITED STATES PATENT OFFICE

CERTIFICATION OF CORRECTION

Patent No. 2,843,741 July 15, 1958

Alvin B. Glenn et al.

It is hereby certified that error appears in the above numbered patent requiring correction and that the said Letters Patent should read as corrected below.

In the heading to the printed specification, between lines 5 and 6, insert -- The terminal fifteen years of the term of the patent have been dedicated to the public --.

Signed and sealed this 25th day of July 1961.

(SEAL)
Attest:

ERNEST W. SWIDER
Attesting Officer

DAVID L. LADD
Commissioner of Patents